(12) United States Patent
Rowles et al.

(10) Patent No.: US 12,269,611 B2
(45) Date of Patent: Apr. 8, 2025

(54) CARGO SYSTEM HAVING BULK AND TRANSPORT CONFIGURATIONS

(71) Applicant: Ancra International LLC, Azusa, CA (US)

(72) Inventors: John F. Rowles, Fullerton, CA (US); Lloyd Misner, Ontario, CA (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 17/689,266

(22) Filed: Mar. 8, 2022

(65) Prior Publication Data

US 2022/0281603 A1 Sep. 8, 2022

Related U.S. Application Data

(60) Provisional application No. 63/158,081, filed on Mar. 8, 2021.

(51) Int. Cl.
*B64D 9/00* (2006.01)
*B64C 1/20* (2006.01)

(52) U.S. Cl.
CPC ............... *B64D 9/003* (2013.01); *B64C 1/20* (2013.01); *B64D 2009/006* (2013.01)

(58) Field of Classification Search
CPC ................................. B64C 1/20; B64D 9/00
See application file for complete search history.

(56) References Cited

U.S. PATENT DOCUMENTS

| | | | |
|---|---|---|---|
| 3,709,450 A | 1/1973 | Watts et al. | |
| 3,877,671 A * | 4/1975 | Underwood | B61D 45/002 410/97 |
| 4,000,870 A | 1/1977 | Davies | |
| 6,302,358 B1 | 10/2001 | Emsters et al. | |
| 7,073,994 B2 | 7/2006 | Huber et al. | |
| 7,195,201 B2 | 3/2007 | Grether et al. | |
| 7,926,762 B2 | 4/2011 | Oetken et al. | |
| 8,474,754 B2 | 7/2013 | Huber et al. | |
| 8,845,249 B2 | 9/2014 | Rowles | |
| 9,022,208 B2 | 5/2015 | Huber | |
| 9,038,947 B2 | 5/2015 | Huber et al. | |

(Continued)

OTHER PUBLICATIONS

C-17 Globemaster III loadmaster, reconfigures the cabin floor to install passenger seats, Aug. 10, 2010, https://www.alamy.com/stock-photo-sra-erik-thomsen-c-17-globemaster-iii-loadmaster-reconfigures-the-129235506.html (Year: 2010).*

(Continued)

*Primary Examiner* — Timothy D Collins
*Assistant Examiner* — Terri L Filosi
(74) *Attorney, Agent, or Firm* — Shook, Hardy & Bacon L.L.P.

(57) ABSTRACT

A cargo system for an aircraft may include one or more of the following: a cargo deck configured for the receipt of bulk cargo, the cargo deck including at least one deck panel; and a cargo transport system including a track for moving a cargo container; and at least one floor fixture exposed on the cargo deck, where the cargo transport system includes an installed state and an uninstalled state, the track being secured to the floor fixture when the cargo transport system is in the installed state and the track being displaced from the cargo deck when the cargo transport system is in the uninstalled state.

20 Claims, 7 Drawing Sheets

(56) References Cited

U.S. PATENT DOCUMENTS

| | | | |
|---|---|---|---|
| 2003/0057326 A1 | 3/2003 | Medina et al. | |
| 2004/0265085 A1 | 12/2004 | Mayer et al. | |
| 2018/0290724 A1 | 10/2018 | Nowarre et al. | |
| 2019/0248499 A1 | 8/2019 | Grether et al. | |
| 2019/0276148 A1 | 9/2019 | Huber et al. | |
| 2020/0223529 A1 | 7/2020 | Spry et al. | |
| 2020/0239122 A1 | 7/2020 | Scheer et al. | |
| 2020/0239123 A1* | 7/2020 | Stegmiller | B64D 9/00 |
| 2021/0354828 A1* | 11/2021 | Nuessen | B64D 9/003 |

OTHER PUBLICATIONS

International Search Report and Written Opinion received for Application No. PCT/US2022/019319 mailed Jun. 13, 2022 (7 pages).
https://www.modcar-system.com, Internet site (12 pp.).
International Preliminary Report on Patentability received for PCT Application No. PCT/US2022/019319, mailed on Sep. 21, 2023, 7 pages.

* cited by examiner

CARGO SYSTEM HAVING BULK AND TRANSPORT CONFIGURATIONS

RELATED APPLICATION

This application claims the benefit of and priority to U.S. Provisional Application Ser. No. 63/158,081 filed on Mar. 8, 2021, which is incorporated herein by reference in its entirety.

TECHNICAL FIELD

This disclosure relates to a cargo system for use in supporting and/or transporting cargo in a vehicle cargo compartment, such as a cargo area within a fuselage of an aircraft.

BACKGROUND

Many aircraft types include cargo compartments, which generally fill the entirety of the fuselage or be located in a lower part of the fuselage below a passenger deck floor. Cargo compartments are generally fillable with either bulk cargo (e.g., passenger suitcases or other cargo that is not packed in standard-sized containers), or alternatively with cargo packaging devices or other containers that are handled by a cargo transport system within the cargo compartment. For example, the cargo transport system may include a Unit Load Device ("ULD"), which is designed to automatically or semi-automatically move packaged containers through the cargo compartment during loading and unloading.

Currently, aircraft cargo compartments are typically assembled for either bulk cargo use or with a cargo transport system. Changing a cargo compartment from one of these configurations to the other generally requires removing the entirety of the cargo deck and replacing it with a deck having the desired equipment. This change procedure a timely process requiring significant man-hours and aircraft downtime. The present disclosure relates to an improved cargo system that addresses these disadvantages.

BRIEF DESCRIPTION OF THE DRAWINGS

Certain features, aspects, and advantages of the disclosed embodiments are shown in the drawings accompanying this description. The drawings are briefly described below.

DETAILED DESCRIPTION

The present embodiments are described with reference to the drawings in which like elements are referred to by like numerals. The relationship and functioning of the various elements of this invention are better understood from the following detailed description. However, the embodiments of the invention are not limited to the embodiments illustrated in the drawings. It should be understood that in certain instances, details have been omitted which are not necessary for an understanding of the present invention, such as conventional fabrication and assembly.

Figure 1:
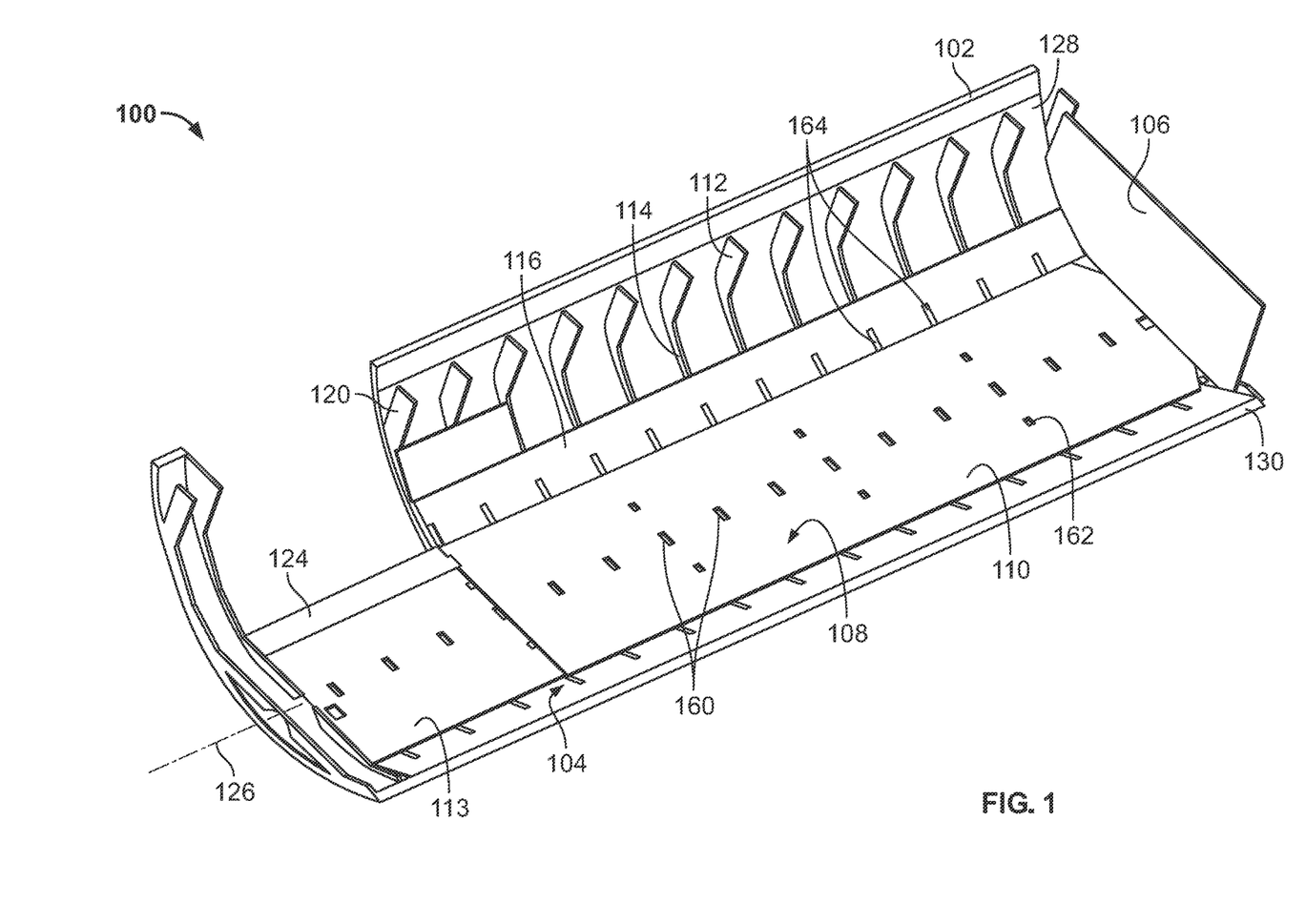
FIG. 1 is an illustration showing a cargo system within the lower portion of an aircraft fuselage, where the cargo system is in a bulk cargo configuration in accordance with certain aspects of the present disclosure.
Figure 2:
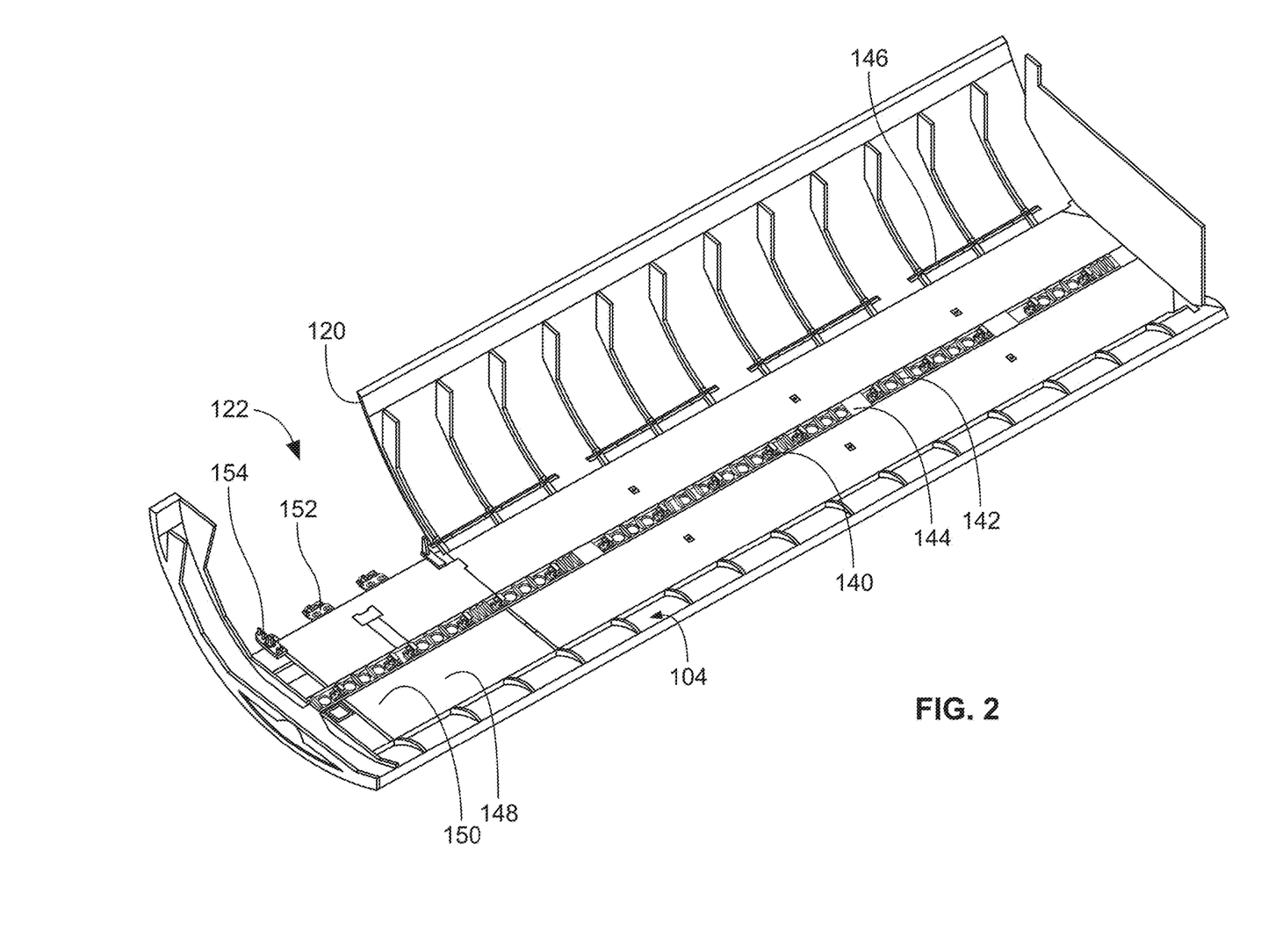
FIG. 2 is an illustration showing the cargo system from FIG. 1 in a cargo transport configuration in accordance with certain aspects of the present disclosure.

The depicted embodiments of FIGS. 1-7 include a cargo system 104 that is adjustable between at least two different states. In the depicted embodiments of the figures, the cargo system 104 is designed for use in a fuselage 102 of a narrow-body aircraft 100, and particularly in a cargo compartment 106 within the fuselage 102. The cargo compartment 106 may substantially fill an entire cross-section of the fuselage 102, or alternatively it may fill only a portion of the fuselage 102 (e.g., a lower compartment below the floor of a passenger deck). In other implementations, the cargo system 104 may be used in an aircraft of a different type, and/or another vehicle type for hauling cargo (e.g., a semi-trailer truck, a train, a ship or other watercraft, etc.). In particular, FIG. 1 shows the cargo system 104 in a first state, and FIG. 2 shows the cargo system 104 in a second state.

Referring to FIG. 1, the first state of the cargo system 104 is depicted as a bulk cargo configuration, which is a configuration generally configured for the receipt of bulk cargo, such as unpackaged cargo and/or other cargo types where a generally flat surface is desirable within the aircraft fuselage 102. As shown, a floor of the lower cargo compartment 106 may be generally defined by a cargo deck 108, which is at least partially defined by the top surface(s) of one or more deck panels 110 secured within the fuselage 102. Any suitable number of deck panels 110 may be included. For example, as shown in FIG. 1, four (4) of the deck panels 110 are included side-by-side and have approximately or exactly the same width such that the floor extends along the length of the interior of the fuselage 102. A fifth deck panel 113 is also included, which has a smaller width to accommodate other features (such as a doorway plate 124, discussed in more detail below). While not visible in FIG. 1, each of the deck panels 110 may be directly or indirectly secured (e.g., via an intervening component) to the frame members 112 defining the frame of the fuselage 102. While any frame members 112 may be used for this purpose, the present embodiment refers to the formers 114 of the aircraft 100. It is contemplated that the deck panels 110 may be secured to floor beams (not shown) located beneath the deck panels 110 for sufficient support, for example, but this is not required.

The first state of the cargo system 104 may optionally include a set of side panels 116 that extend outward from the deck panels 110. In the present embodiment, the side panels 116 are angled (e.g., at approximately 45 degrees relative to the deck panels 110) such that they extend upward along the frame members 112 of the aircraft. The side panels 116 may create additional floor space within the fuselage 102, prevent cargo from rolling or otherwise moving off the deck panels 110, prevent unintentional cargo engagement with the frame members 112, etc. Thus, the top surface of the side panels 116 may form certain portions of the cargo deck 108. While the side panels 116 are depicted as being separate panel bodies with respect to the deck panels 110, it is contemplated that the deck panels 110 and the side panels 116 may be a unitary panel piece. While not required, the side panels 116 may be removed when the cargo system 104 is converted from the bulk cargo configuration to the cargo transport configuration.

Panels with different dimensions may form the floor area adjacent to the cargo doorway 120 of the aircraft 100. As shown, a deck panel 113 may be generally similar to the deck panels 110, but may have a width that is smaller than the width of the deck panels 110. This smaller width may be advantageous for providing space for at least one doorway plate 124 located adjacent to the doorway opening. As discussed in more detail below, the doorway plate 124, which in this instance includes two distinct plates (which is not required), may be configured to receive components receiving cargo through the cargo doorway 120 in a cargo transport system (e.g., a ULD device).

The floor of the cargo system 104 may have built-in features for securing cargo and/or securing other devices (e.g., cargo nets or other devices). For example, a first set of fixtures, which may have any suitable fixture structure and in this case are depicted as a set of fixture plates 160, may be located such that they are generally aligned with a central axis 126 of the cargo deck. In other words, the fixture plates 160 may be approximately (or exactly) equidistant from a first wall 128 and a second wall 130 of the fuselage such that they are generally centered within the aircraft. As discussed in greater detail below, these fixture plates 160 may be configured to secure to a roller track of a cargo loading system, for example. When the cargo system 104 is in the bulk cargo configuration, a top face of the fixture plates 160 may be generally aligned with the cargo deck 108 such that substantial discontinuities on the cargo deck 108 are avoided, but this feature is optional.

Additionally or alternatively, the cargo deck may include a second set of fixtures (e.g., holds, latches, or other restraints), which are generally depicted as a set of fixtures 162. The fixtures 162 may be offset from the central axis 126. The fixtures 162 may be spaced apart or otherwise located such that they are suitable for receiving and fixing one or more devices. Without limitation, these fixtures 162 may be configured for securing to a cargo net, partition elements, spacers, the end of a ratchet strap for securing cargo, or any other suitable device. While the fixtures can be built into the deck panels 110 (and therefore remain in the same place relative to the fuselage), it is contemplated that they may be movable relative to the deck panels 110, such as when the fixtures are capable of being removed and reattached to the deck panels 110, for example.

In some embodiments (including the depicted embodiment of FIG. 1), an additional set of fixtures, in this case the fixture plates 164, may be included along the sides of the cargo floor. While any suitable function for these fixture plates 164 is contemplated, the fixture plates 164 in the depicted embodiment are configured to secure to side guides of a cargo transport system (as discussed in more detail below).

Referring to FIG. 2, the second state of the cargo system 104 is depicted as a cargo transport configuration, and specifically a Unit Load Device ("ULD") cargo transport configuration. This configuration includes a cargo transport system 140 that is generally configured to facilitating loading and unloading of certain cargo types (e.g., within a package or container having known parameters, perhaps designed for compatibility with the cargo transport system 140). The cargo system 104 may be an automatic or semi-automatic system that raises the efficiency of loading and unloading with reduced manpower. For example, the cargo transport system 140 may include a series of actuators and a control system for moving cargo without human intervention (beyond operating the controls).

Without limitation, the cargo transport system 140 may include a roller track 142 that is substantially centered on the cargo floor, and which may include a plurality of rollers or other devices for assisting cargo movement. The roller track 142 may also include a set of latches 144 for securing cargo containers once they reach a desired location. The cargo system 104 may also include a set of side rails or side guides 146 that help ensure proper alignment of cargo during the loading and unloading process. A ball mat 148 may be included in the loading area 150 adjacent to the cargo door 122, as shown, which assist loading and the movement of packaged cargo entering (and exiting) the door prior to full engagement with the roller track 142, for example. Door sill latches 152 and/or entrance guides 154 may also be included to facilitate the movement of cargo through the cargo doorway 120 and into engagement with the cargo transport system 140.

An advantage of the depicted embodiment is the ability to install the cargo transport system 140 without removal of the bulk cargo components (e.g., the deck panels 110). This is in contrast with existing systems, where switching an aircraft from a bulk cargo configuration to a cargo transport configuration requires nearly complete removal of the bulk cargo components, thereby requiring significant time and manpower to accomplish. The depicted embodiment provides this advantage via a set of unique features that link the two configurations together with components common to both configurations. In addition, the modular nature of the cargo transport system 140 facilitates its quick and efficient installation, which may contrast with existing systems (where transport components are generally built into corresponding flooring).

For example, referring to FIG. 1, the fixture plates 160 may be used for locking the roller track 142 of FIG. 2 in its installed position, and the fixture plates 160 may remain exposed on the cargo deck when the roller track 142 is uninstalled. Thus, the fixture plates 160 may have a dual purpose: (1) acting as latches, holds, or other fixture types for securing cargo (or a net or other divider) in place when the cargo system 104 is in a bulk cargo configuration; and (2) fixing the roller track in place when the cargo system 104 is in a cargo transport configuration. Similarly, the fixture plates 160 may facilitate securement of at least one of the ball mat 148 and the roller track 142, for example.

The fixture plates 164 may accomplish a similar function with the side guides 146 of the cargo transport system 140, as they may be configured (e.g., sized and shaped) for fastening to the side guides 146 when the cargo system 104 is in the cargo transport configuration. Thus, the fixture plates 164 may have a dual purpose: (1) form at least a portion of the top surface of the cargo deck 108 when the cargo system 104 is in the bulk cargo configuration; and (2) form an anchor point for securement of the side guides 146 of the cargo transport system 140 when the cargo system 104 is in the cargo transport configuration.

The doorway plate 124 shown in FIG. 1 may also be configured to function in both configurations. In the bulk cargo configuration, the doorway plate 124 may generally form a portion of the cargo deck 108 near the cargo doorway 120. When desirable, the doorway plate 124 may have a generally flat upper surface such that it provides a relatively flat portion of the cargo deck 108 in the loading area near the doorway 120. In the cargo transport configuration, the doorway plate 124 may be coupled to, or otherwise in mechanical engagement with, at least one of the door sill latches 152 and the entrance guides 154 shown in FIG. 2.

Figure 3:
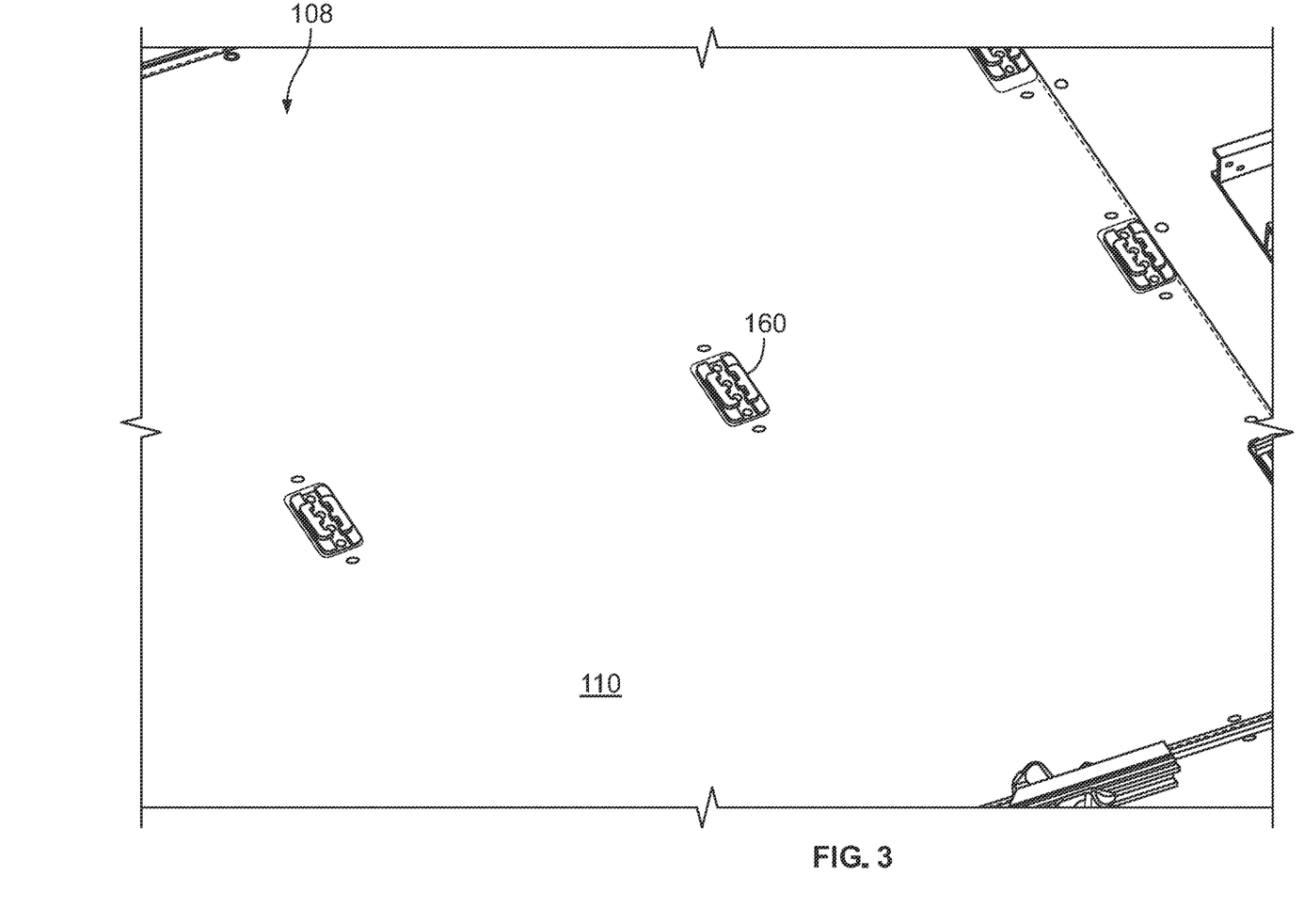
FIG. 3 is an illustration showing a set of fixture plates located on the cargo surface of the cargo system of FIG. 1 when the cargo system is in the bulk cargo configuration in accordance with certain aspects of the present disclosure.
Figure 4:
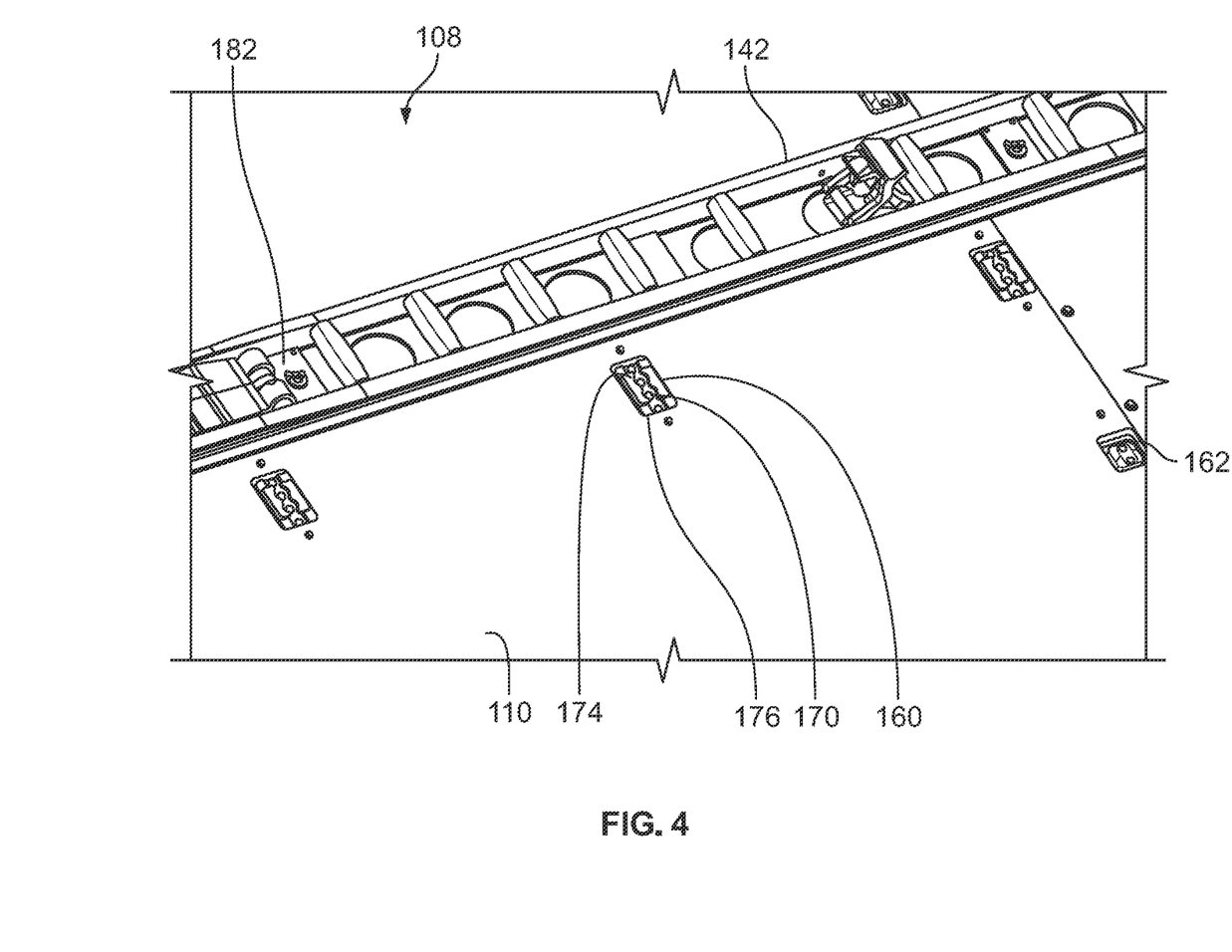
FIG. 4 is an illustration showing the set of fixture plates from FIG. 3 as they near engagement with a roller track for use in a cargo transport configuration in accordance with certain aspects of the present disclosure.

FIGS. 3-4 show a non-limiting example of the fixture plates 160 shown in FIG. 1 above. As shown, the fixture plates 160 may generally include at least one female coupling 170 for receiving a corresponding male coupling of another device. Thus, when the fixture plates 160 are secured to the roller track 142 (shown in FIG. 4 as being moved towards its installed state), a male coupling on the underside of the roller track 142 may engage the female coupling 170 of the fixture plates 160. For example, the roller track 142 includes a set of fixture plates 182 that are configured to secure to the fixture plates 160. Other structures are alternatively contemplated.

When the roller track 142 is absent (as shown in FIG. 3), the fixture plates 160 may have an upper face 174 that is generally flush with the remainder of the cargo deck 108 to prevent substantial discontinuities on the cargo surface that may interfere with cargo placement. In other embodiments, the fixture plates 160 may be removable altogether when the cargo system 104 is in the bulk cargo configuration. Further, it is contemplated that the fixture plates 160 may attach to a net or other divider, a ratchet strap, or any other suitable device for handling and/or partitioning cargo when the cargo system 104 is in a bulk cargo configuration.

In the depicted embodiment, the fixture plates 160 are located within gaps 176 formed in the deck panels 110. This may be advantageous where it is desirable for the fixture plates 160 (or other fixture type) to be directly secured to the aircraft frame members, thereby enhancing its anchoring capability (e.g., without stressing the deck panels 110). In other embodiments, the fixture plates 160 may be secured to the top of the deck panels 110, and/or they may be formed within the deck panels 110 in an integral design. These same aspects also apply to the secondary fixtures 162 of the cargo system 104.

Figure 5:
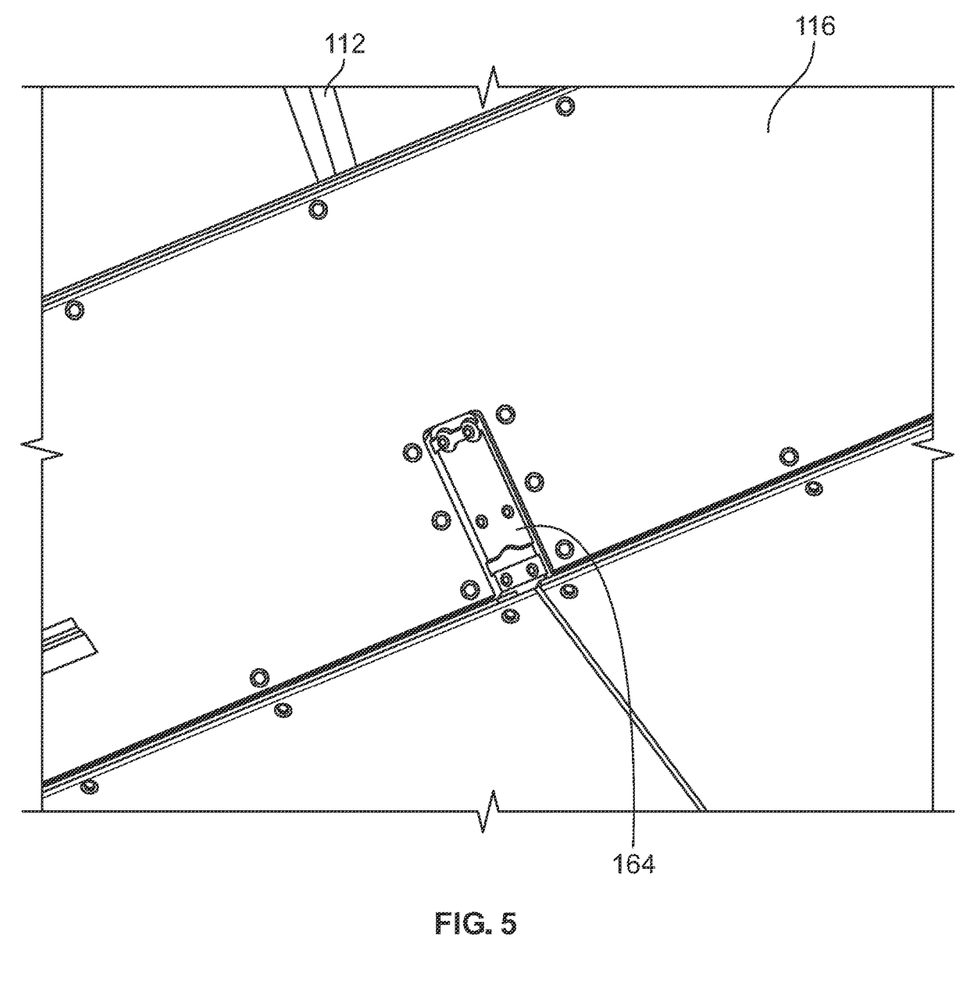
FIG. 5 is an illustration showing a set of fixture plates located on side portions of the cargo surface of the cargo system of FIG. 1 when the cargo system is in the bulk cargo configuration in accordance with certain aspects of the present disclosure.
Figure 6:
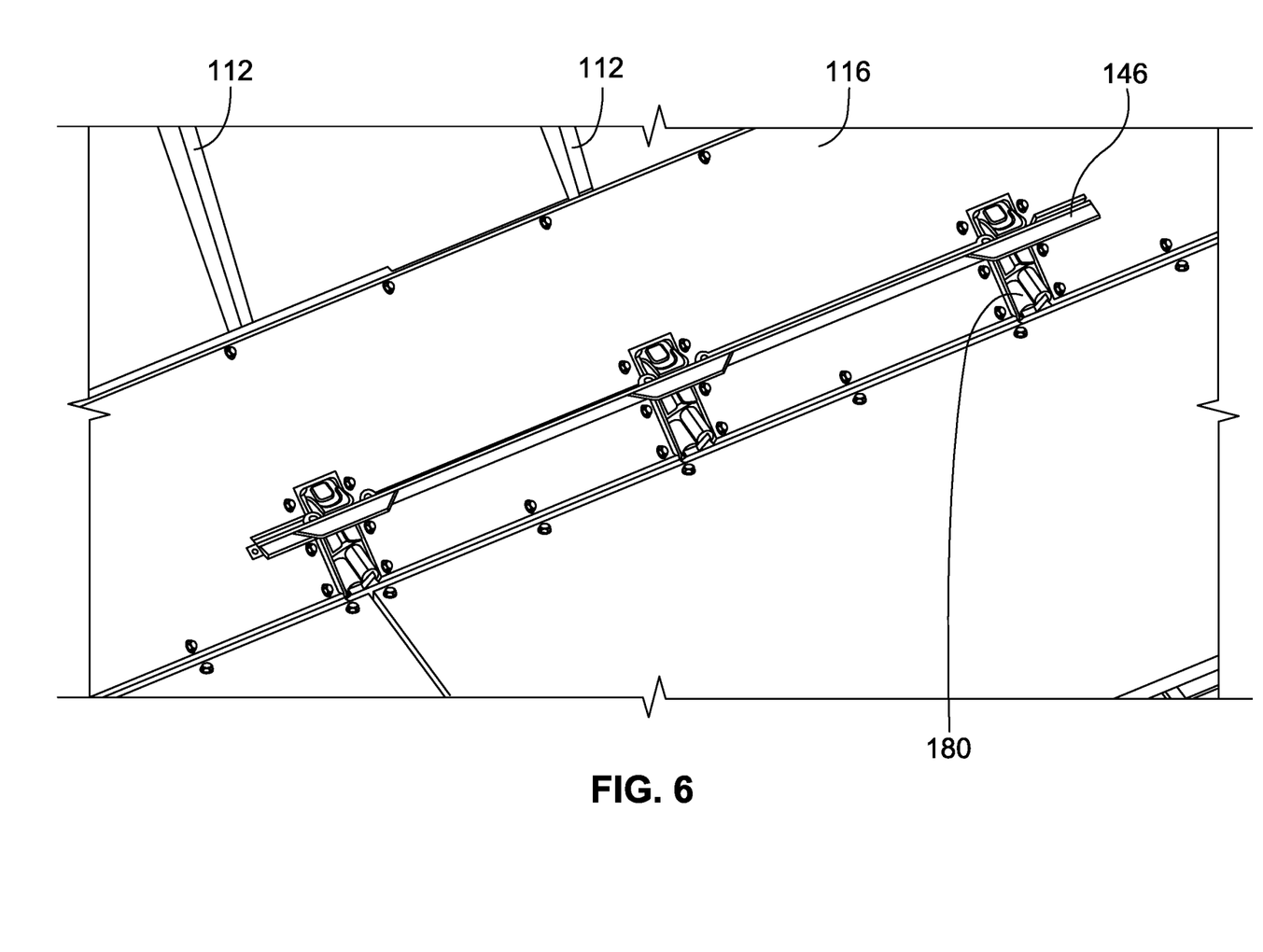
FIG. 6 is an illustration showing the fixture plates from FIG. 5 being coupled to side guides used in the cargo transport configuration in accordance with certain aspects of the present disclosure.

All of the floor fixtures discussed herein may have any suitable construction. For example, in certain embodiments, one or more of the floor fixtures may include a quick-release device and/or related devices, such as those described in U.S. Pat. No. 8,845,249 ("QUICK RELEASE DEVICE"), issued Sep. 30, 2014, and assigned to Ancra International LLC. Other types of floor fittings are additionally or alternatively contemplated. For example, FIGS. 5-6 show a non-limiting example of a fixture plates 164 for the side guides 146, which are also shown in FIG. 1. Referring to FIG. 5, the fixture plate 164 is similar in design to the fixture plate 160 discussed above with reference to FIGS. 3-4, but differences in the designs are also contemplated. In this example, the fixture plate 164 includes a set of female couplings 180 for receiving a corresponding male coupling fixed to the side guide 146, as shown in FIG. 6. As discussed above, the fixture plate 164 may be directly secured to a frame member 112 of the aircraft, thereby enhancing its anchoring ability without stressing the side panel 116. In other embodiments, the fixture plate 164 may be secured to a surface of the side panel 116. Other fixture designs may be additionally or alternatively be used.

Figure 7:
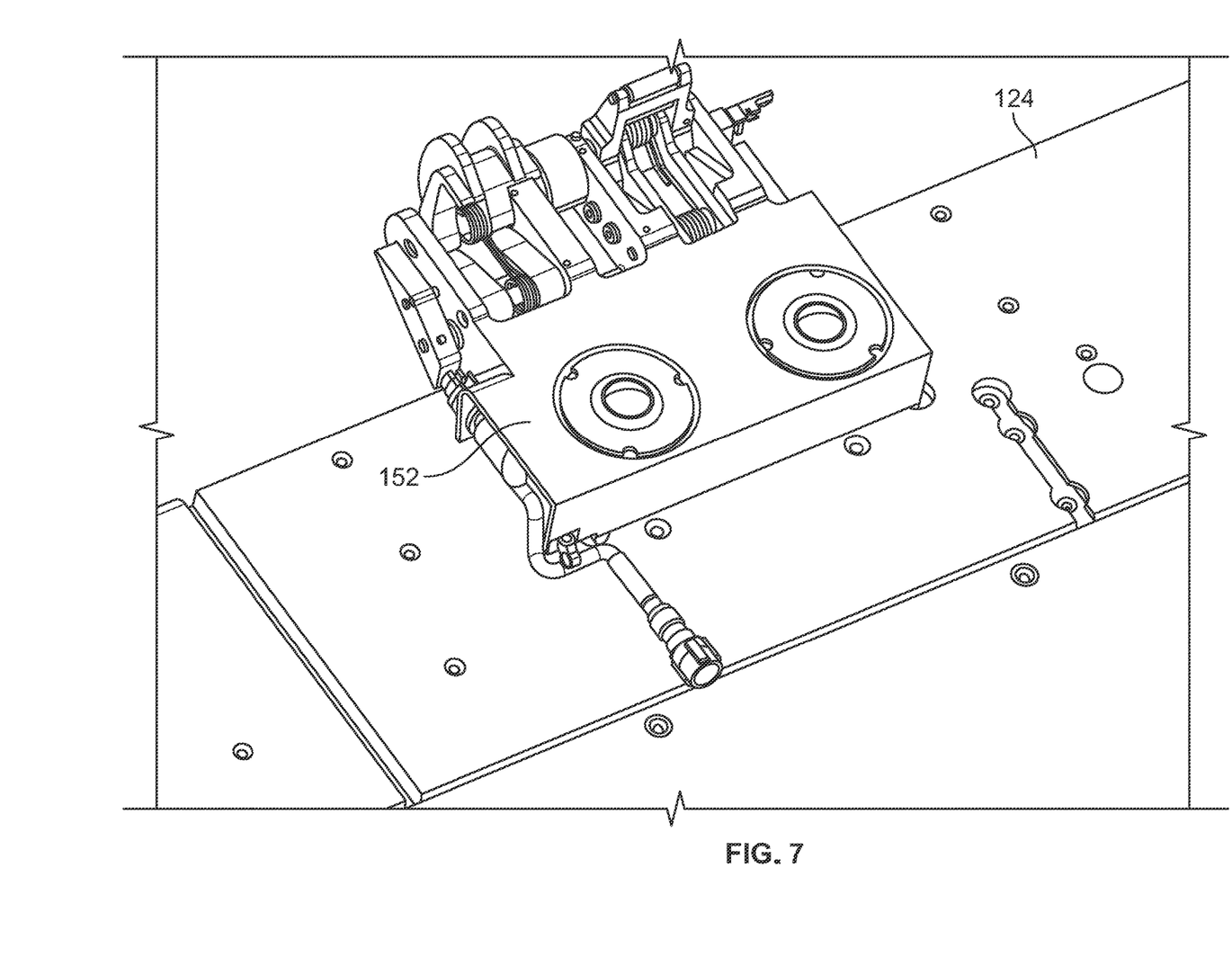
FIG. 7 is an illustration showing a doorway plate of the cargo system of FIG. 1 being coupled to a door sill latch in accordance with certain aspects of the present disclosure.

FIG. 7 shows an example of a door sill latch 152 that is installed on the doorway plate 124. The door sill latch 152, which may secure an external loading device in place when it reaches the cargo door, may be secured to the doorway plate 124 in any suitable manner. For example, the door sill latch 152 may grip an edge of the doorway plate 124, may be clamped to the doorway plate 124, may include one or more couplings (e.g., a male coupling) that corresponds with a coupling of the doorway plate (e.g., a female coupling), and/or a combination thereof. While not shown, the entrance guides 154 (FIG. 2) may be secured to the doorway plate 124 in a similar manner.

Having described various aspects of the subject matter above, additional disclosure is provided below that may be consistent with the claims originally filed with this disclosure. In describing this additional subject matter, reference may be made to the previously described figures.

A first general aspect includes a cargo system for restraining cargo within an aircraft, including one or more of the following: a cargo deck configured for the receipt of bulk cargo, the cargo deck including at least one deck panel; and a cargo transport system including a track for moving a cargo container; and at least one floor fixture exposed on the cargo deck, where the cargo transport system includes an installed state and an uninstalled state, the track being secured to the floor fixture when the cargo transport system is in the installed state and the track being displaced from the cargo deck when the cargo transport system is in the uninstalled state.

Implementations may include one or more of the following features. The cargo system may be included where the floor fixture includes a fixture plate, the fixture plate having a top face that is generally flush with a top surface of the cargo deck. The cargo system may be included where the floor fixture is located within an opening of the cargo deck. The cargo system may be included where the floor fixture is fixed directly to a frame member of a fuselage of the aircraft. The cargo system may be included further including at least one side panel that is angled relative to the at least one deck panel of the cargo deck. The cargo system may be included where a second fixture is located adjacent to the side panel and forms a portion of the cargo deck, the second fixture being exposed on the cargo deck. The cargo system may be included where the second fixture is located in an opening of the side panel such that it is fixed directly to a frame member of a fuselage of the aircraft. The cargo system may be included where the cargo transport system further includes a side guide that is installable via securement to the second fixture. The cargo system may be included where the second fixture includes a top face that is generally flush with a surface of the side panel. The cargo system may be included further including a doorway plate that forms a portion of the cargo deck at a location adjacent to a doorway of a fuselage, and where the doorway plate is configured for connecting to at least one of a door sill latch, an entrance guide, and a ball mat of the cargo transport system. The cargo system may be included where the track includes a second fixture that is configured to couple to the floor fixture during installation of the track.

A second general aspect includes a method, including one or more of the following: installing a cargo transport system within a cargo compartment of an aircraft, where the cargo compartment includes a cargo deck and a set of floor fixtures that are exposed on the cargo deck when the cargo deck is in a bulk cargo configuration, and where installing the cargo transport system includes coupling a roller track to the set of floor fixtures.

Implementations may include one or more of the following features. The method where the set of floor fixtures includes a fixture plate, the fixture plate having a top face that is generally flush with a top surface of the cargo deck. The method where at least one of the floor fixtures is located within an opening of the cargo deck. The method where installing the cargo transport system further includes joining a side guide to a second fixture, the second fixture being fixed to at least one of the cargo deck and a frame member of a fuselage of the aircraft. The method where installing the cargo transport system further includes securing at least one of a door sill latch, an entrance guide, and a ball mat to a doorway plate, the doorway plate having a top surface that is generally flush with a panel adjacent to the doorway plate, the panel forming at least a portion of a top surface of the cargo deck.

A third general aspect includes a cargo system for restraining cargo within an aircraft, including one or more of the following features: a first configuration, where the first configuration includes a cargo deck configured for the receipt of bulk cargo; and a second configuration, where the second configuration includes a cargo transport system configured to handle packaged cargo, where the cargo system is adjustable via attaching a track of the cargo transport system to a floor fixture, and where the floor fixture is exposed on the cargo deck when the cargo system is in the first configuration.

Implementations may include one or more of the following features. The cargo system may be included where the floor fixture includes a fixture plate, the fixture plate having a top face that is generally flush with a top surface of the cargo deck. The cargo system may be included where the floor fixture is located within an opening of the cargo deck. The cargo system may be included where the floor fixture is fixed directly to a frame member of a fuselage of the aircraft.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A cargo system for restraining cargo within an aircraft, the cargo system comprising:
   a cargo deck comprising at least one deck panel;
   a cargo transport system comprising a track for moving a cargo container;
   a divider; and
   at least one floor fixture,
   wherein the cargo system is convertible between a bulk cargo configuration and a cargo transport configuration, the track being secured to the floor fixture when the cargo system is in the cargo transport configuration and the track being disconnected from the floor fixture when the cargo system is in the bulk cargo configuration, and
   wherein the divider is attached to the floor fixture when the cargo system is in the bulk cargo configuration and is detached from the floor fixture when the cargo system is in the cargo transport configuration.

2. The cargo system of claim 1, wherein the floor fixture comprises a female coupling component.

3. The cargo system of claim 2 further comprising, a male coupling that, in the cargo transport configuration, is positioned at an underside of the track and is releasably connected to the female coupling of the floor fixture.

4. The cargo system of claim 1, wherein the divider comprises a cargo net.

5. The cargo system of claim 1, wherein the floor fixture is attachable to an end of a ratchet strap when the track is disconnected and the cargo system is in the bulk cargo configuration.

6. The cargo system of claim 1, further comprising at least one side panel that is angled relative to the at least one deck panel of the cargo deck.

7. The cargo system of claim 6 further comprising, a second fixture located adjacent to the side panel.

8. The cargo system of claim 7, wherein the second fixture is located in an opening of the side panel such that it is fixed directly to a frame member of a fuselage of the aircraft.

9. The cargo system of claim 7, wherein the cargo transport system further includes a side guide that is installable via securement to the second fixture.

10. The cargo system of claim 7, wherein the second fixture includes a top face that is generally flush with a surface of the side panel.

11. The cargo system of claim 1, further comprising a doorway plate that forms a portion of the cargo deck at a location adjacent to a doorway of a fuselage, and wherein the doorway plate connects to a door sill latch and an entrance guide.

12. A method comprising:
    installing a cargo transport system within a cargo compartment of an aircraft, wherein the cargo compartment includes a cargo deck and a floor fixture attached to a frame member of the aircraft;
    as part of converting the cargo transport system to a bulk cargo configuration, attaching a divider to the floor fixture and detaching a roller track from the floor fixture; and
    as part of converting the cargo transport system to a cargo transport configuration, attaching the roller track to the floor fixture and detaching the divider from the floor fixture.

13. The method of claim 12, wherein the floor fixture includes a fixture plate, the fixture plate having a top face that is generally flush with a top surface of the cargo deck.

14. The method of claim 13, wherein the floor fixture is located within an opening of the cargo deck.

15. The method of claim 12, wherein installing the cargo transport system further includes joining a side guide to a second fixture, the second fixture being fixed to at least one of the cargo deck and a frame member of a fuselage of the aircraft.

16. The method of claim 12, wherein installing the cargo transport system further includes securing at least one of a door sill latch, an entrance guide, and a ball mat to a doorway plate, the doorway plate having a top surface that is generally flush with a panel adjacent to the doorway plate, the panel forming at least a portion of a top surface of the cargo deck.

17. A cargo system for restraining cargo within a cargo compartment of an aircraft, the cargo system comprising:
    a doorway plate attachable at a doorway of the cargo compartment of the aircraft;
    a doorway latch that attaches to the door sill plate and that secures to an external loading device;
    a floor fixture that is attachable to a frame member of the aircraft and that comprises a female coupling;
    a bulk cargo configuration in which the female coupling is attached to at least one of a cargo net, a partition, a spacer, or a ratchet strap; and
    a cargo transport configuration in which the female coupling is attached to a track of a cargo transport system configured to handle packaged cargo.

18. The cargo system of claim 17, wherein the female coupling comprises an undercut positioned between two openings in an upper face of the floor fixture.

19. The cargo system of claim 17, wherein the floor fixture is positionable within an opening of the cargo deck.

20. The cargo system of claim 17 further comprising, a male coupling that, in the cargo transport configuration, is positioned at an underside of the track and is releasably connected to the female coupling of the floor fixture.

* * * * *